US009196771B2

(12) United States Patent
Rodin et al.

(10) Patent No.: US 9,196,771 B2
(45) Date of Patent: Nov. 24, 2015

(54) DEPLOYABLE PHOTOVOLTAIC ARRAY AND COLLAPSIBLE SUPPORT UNIT THEREOF

(71) Applicants: Vadim Rodin, Lichtenstein (DE); Liubov Rodin, Lichtenstein (DE)

(72) Inventors: Vadim Rodin, Lichtenstein (DE); Liubov Rodin, Lichtenstein (DE)

( * ) Notice: Subject to any disclaimer, the term of this patent is extended or adjusted under 35 U.S.C. 154(b) by 0 days.

(21) Appl. No.: 13/667,034

(22) Filed: Nov. 2, 2012

(65) Prior Publication Data

US 2013/0233371 A1    Sep. 12, 2013

Related U.S. Application Data

(60) Provisional application No. 61/608,364, filed on Mar. 8, 2012.

(51) Int. Cl.
*H01L 31/042* (2014.01)
*H02S 30/20* (2014.01)

(52) U.S. Cl.
CPC .............. *H01L 31/045* (2013.01); *H02S 30/20* (2014.12)

(58) Field of Classification Search
CPC .............................. H02S 30/20; H01L 31/045

USPC .................................................. 136/243–265
See application file for complete search history.

(56) References Cited

U.S. PATENT DOCUMENTS

| 5,131,955 | A | * | 7/1992 | Stern et al. | 136/245 |
| 6,808,000 | B1 | * | 10/2004 | Peterson | 160/84.11 |
| 2005/0211294 | A1 | * | 9/2005 | Chittibabu et al. | 136/263 |
| 2009/0039705 | A1 | * | 2/2009 | Lyman et al. | 307/64 |

\* cited by examiner

*Primary Examiner* — Allison Bourke
*Assistant Examiner* — Niki Bakhtiari
(74) *Attorney, Agent, or Firm* — John C. Thompson; Sandra J. Thompson

(57) ABSTRACT

A deployable photovoltaic array comprising a plurality of photovoltaic modules attached to a collapsible support unit, where said support unit is made up of a pair of laterally spaced similar pantographs. Each pantograph has the form of a plurality of interconnected rhombs made by pivotally joined elongated arms. Two opposite sides of each solar module are attached to a pair of corresponding nearest parallel arms on the opposite sides of said pantographs. Said array in its deployed condition for large solar elevation angles acquires a characteristic staircase-like form. Angles of said rhombs may further be adjusted to achieve an optimal inclination of said solar modules with respect to the current direction to the sun. In the stowed configuration said array may be held in a protecting container, and is readily portable.

4 Claims, 5 Drawing Sheets

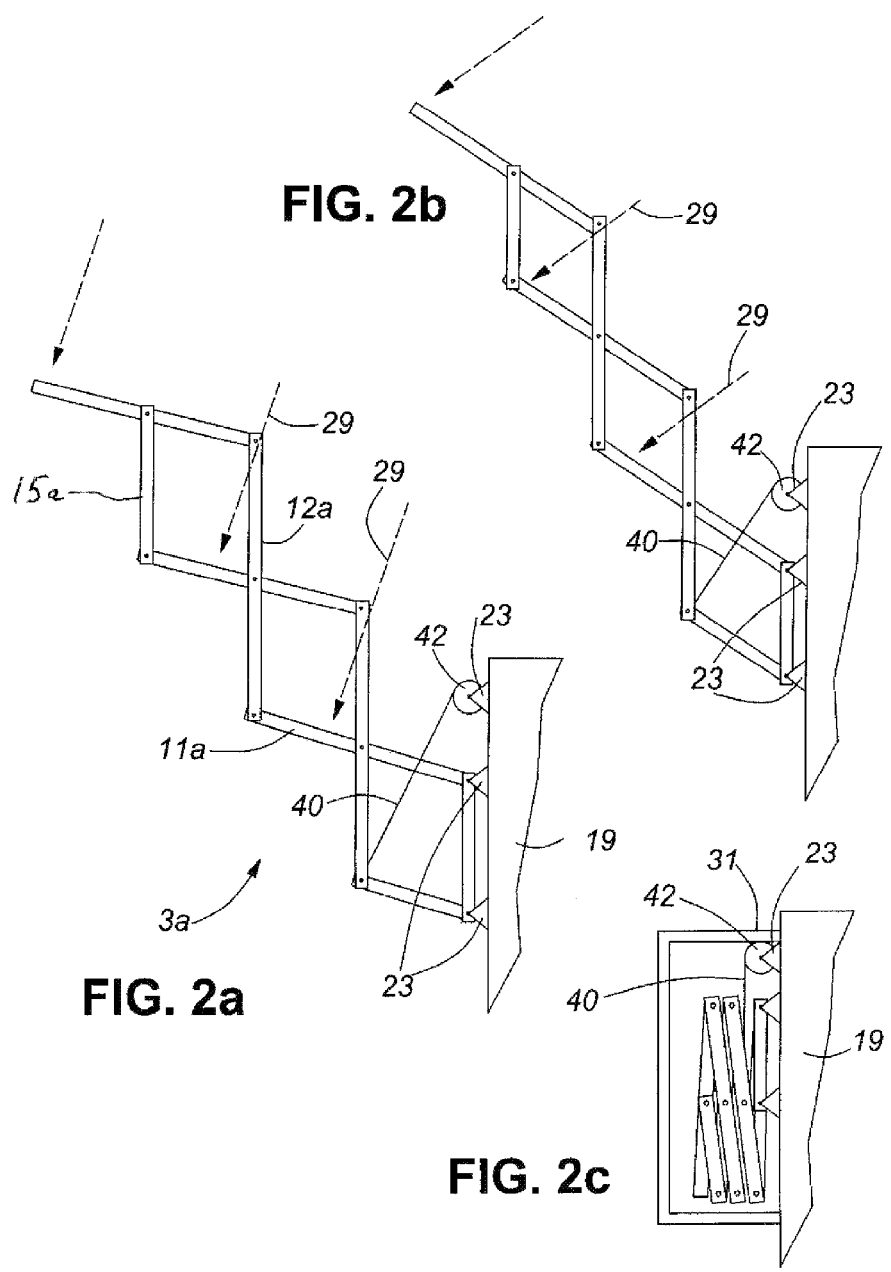

DEPLOYABLE PHOTOVOLTAIC ARRAY AND COLLAPSIBLE SUPPORT UNIT THEREOF

CROSS-REFERENCE TO RELATED APPLICATIONS

This application claims priority from U.S. provisional patent application Ser. No. 61/608,364 filed Mar. 8, 2012.

TECHNICAL FIELD

This invention generally relates to a solar radiation collection system, and more particularly to an array of photovoltaic (PV) modules mounted on a collapsible support unit.

BACKGROUND OF THE INVENTION

The potential permanent exhaustion of world natural resources calls for development of alternative sources of energy. Solar power provides an essentially inexhaustible source of energy. However, the intensity of solar radiation on earth is relatively low, and large areas are needed for solar harvesting systems in which sunlight is collected and converted into electricity, typically by photovoltaic (PV) generation means. These systems need rather large initial investments to be constructed, and must therefore run for longest possible time to make profit.

The efficiency of PV cells is permanently growing (currently the best values about 40% have been achieved), that makes them a very attractive means for a direct conversion of sunlight into electricity. However, PV panels have a rather limited resistance to harsh weather conditions. To increase the resistance, PV panels are strengthened by implementing rather thick metal and/or glass plates. This makes PV panels heavy and difficult to transport.

As a consequence of the global warming, extremely heavy hail, storms, and/or hurricanes are more likely to happen. Thus the possibility of damage to solar power systems will be growing. Therefore, providing safety to solar energy systems becomes an important economical issue.

One of the possible solutions to the problem of the long-term weather resistance of solar systems is provided by a collapsible array that can be retracted and stored in a protective housing during a harsh weather (strong wind, hail, etc.), and deployed under favored external conditions.

Deployable solar arrays are known in the art and are found in power supplies for space vehicles. The deployable solar arrays are typically stowed in a small container within their space vehicle during its launch, and are later deployed to an extended working configuration on the desired orbit. Examples of such arrays, in which pantograph like deployment mechanisms are used, can be found in the following United States patents: U.S. Pat. No. 3,460,992, issued to Avilov et al., U.S. Pat. No. 4,380,013 issued to Slysh, U.S. Pat. No. 5,131,955, issued to Stern et al., U.S. Pat. No. 5,487,791, issued to Everman et al., U.S. Pat. No. 5,961,738, issued to Benton et al., and U.S. Pat. No. 6,423,895, issued to Murphy et al. However, the deployable PV systems disclosed in the aforementioned patents were intended to be deployed as large satellite wings in weightless conditions on the orbit, which is not straightforwardly to be done on earth due to the fragility of the systems. In addition, only a single act of deployment was foreseen in the inventions, as is needed for a satellite, and no reference is made to a possibility of multiple retractions/deployments of a solar array.

U.S. Pat. No. 6,808,000, issued to Peterson, teaches a vertically movable mechanical curtain or partition utilizing a plurality of laterally spaced apart pantographs. This design resembles a honeycomb window shade, but is substantially larger. The partition is movable between a raised storage position and a lowered position. It is suggested that the fabric of the partition may be of a solar cell material that can convert light energy into electrical energy.

OBJECTS AND SUMMARY OF THE INVENTION

It is a primary object of the present invention to provide a deployable photo-voltaic array having better protection for the PV modules against unfavorable environmental conditions. This results in a longer life-time and better efficiency of the whole apparatus. This object is achieved by providing an array which may be stowed under bad weather conditions, and deployed by appropriate weather.

This is another object of this invention to provide a support unit for solar modules which can quickly be collapsed, for protection of said array against unfavorable environmental conditions or for transportation, which support unit can be readily deployed under favorable conditions.

An additional object of the present invention is to provide a rigid collapsible support structure for PV modules which may be lightweight.

Still another object of this invention is to provide a solar array which is readily portable and can quickly be deployed on any kind of terrain.

A further object of the present invention is to provide a method of optimal positioning of said array of PV modules with respect to the direction to the sun.

Yet another object of this invention is to provide an apparatus with significantly reduced wind drag forces under windy conditions.

Still another object of the invention is to provide a PV array which allow for a better natural cooling of its solar modules improving thereby their efficiency.

The present invention accomplish these and other intended objects and advantages over the prior art devices by disclosed herein deployable photovoltaic array comprising a plurality of photovoltaic modules attached to a collapsible support unit, where said support unit is made up of a pair of laterally spaced similar pantographs. Each pantograph has the form of a plurality of interconnected rhombs made by pivotally joined elongated arms. Two opposite sides of each solar module are attached to a pair of corresponding nearest parallel arms on the opposite sides of said pantographs. Thereby an array of parallel solar modules is formed. Said array in its deployed condition for large solar elevation angles acquires a characteristic staircase-like form. Angles of said rhombs may further be adjusted to achieve an optimal inclination of said solar modules with respect to the current direction to the sun. In tine stowed configuration said array may be held in a container, protecting against unfavorable external conditions, and is readily portable.

BRIEF DESCRIPTION OF THE DRAWINGS

Advantages of the present invention will become apparent upon reading the following detailed description with reference to the drawings in which:

FIGS. 2a and 2b are side elevation views of a vertically surface mounted PV array of the type shown in FIG. 1, showing that array in FIGS. 2a and 2b in a deployed configurations, these views illustrating in schematic fashion a mechanism for varying the angles of the PV array, for example summer in FIG. 2a, and winter in FIG. 2b;

FIG. 2c shows the array of FIGS. 2a and 2b in a stowed position;

DETAILED DESCRIPTION

Figure 1:
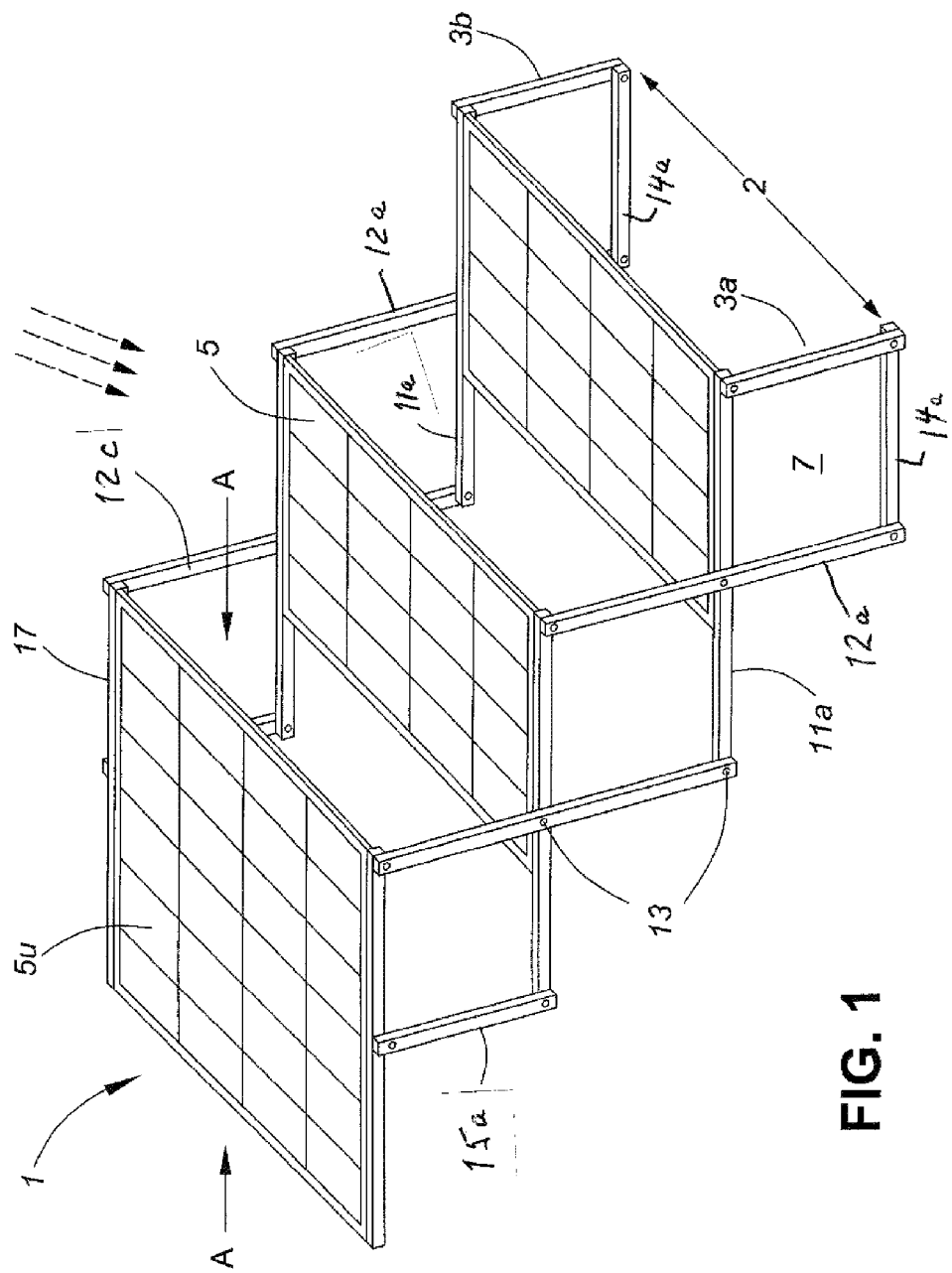
FIG. 1 is a perspective view of a preferred embodiment of the PV array of the present invention in its deployed condition, the array being attached to either a horizontal or vertical surface, not shown.

In the following description, similar structural elements of said PV array in the drawings have been given same reference numerals.

The first preferred embodiment of PV array of present invention is indicated generally at 1. It is shown in FIG. 1 in its deployed condition for a large solar elevation angle, such as midday in the summer. As can be seen, the solar array has a staircase-like form. A pair of laterally spaced pantographs 3a and 3b make up the collapsible support unit 2 for solar PV modules, which are indicated generally at 5. In this view three modules are shown by way of example. Each pantograph has the form of a set of interconnected rhombs 7 which are made by elongated arms 11 which support the solar PV modules, and by connecting arms or links 12, which are pivotally joined to each other by scissor linkages or pivots 13. In FIG. 1 by way of example each pantograph consists of three such rhombs. The pantographs are oriented approximately mirror symmetric to each other with respect to the cross-section along the line A-A in FIG. 1. As can best be seen from FIG. 4, each solar PV module 5 has essentially rectangular rigid frame 17. Two opposite parallel sides 18a and 18b of each solar module frame 17 are attached to pairs of corresponding nearest arms 11a and 11b of pantographs 3a and 3b. Thereby said PV modules 5 are arranged in an array parallel to one another.

In the deployed configuration shown in FIG. 1, the width of all PV modules 5, except optionally the uppermost one 5u, are preferably smaller then the length of arms 11a, 11b, in order to avoid shadowing of the lower PV module from the upper PV module. The angles of rhombs 7 in the optimal deployed configuration are then determined by the solar elevation angle and the ratio of the module width to the arm length. The uppermost PV module 5u can optionally be the widest in the array, with its width approximately equal to the length of the arms to which it is attached.

In FIGS. 2a and 2b side elevation views of different configurations of array 1 are given. The lowest rhombs of the pantographs shown in these FIGS. have their two side vertices pivotally fixed to an essentially vertical surface of base 19 by means of mounting elements 23. In FIG. 2a the deployed configuration corresponds generally to the one shown in FIG. 1 and is an optimal one for a large solar elevation angle, when the sun is close to zenith (as appears at the midday in summer). The incoming rays of solar light are shown by broken arrows 29. In FIG. 2b the deployed configuration corresponds to a lower solar elevation angle—such as winter, with both pantographs 3a and 3b further elongated as to achieve an optimal inclination of said solar modules with respect to the direction to the sun.

In FIG. 2c the array is shown in its stowed condition, with the pantographs contracted. In the stowed condition the array can be stored in a container 31 (whose walls are schematically shown by a shadowed line in FIG. 2c) for its protection against severe environmental conditions. In such a case base 19 coincides with a wall, or a bottom, of the container. In its stowed position in the container the array is readily portable and can quickly be deployed on any kind of terrain, with no, or minimal, preparative work on the ground.

As preferred but optional feature of the invention, some of the upper arms of pantographs and/or some of the upper modules can be made lighter than the lower ones in order to reduce the torque of the gravitational force with respect to mounting elements 23. Stowable support unit 2 may be lightweight (made of light metal, high-strength plastic, or the like), but still possesses enough rigidity in its deployed configuration.

Deployment of the array from its stowed condition of FIG. 2c into the deployed, operative configuration of FIG. 2a and FIG. 2b can be accomplished by various means known in the art. In general, such means would exert an external force acting on the array, and causing the movement of the PV modules simultaneously in vertical and horizontal directions. Such a force may be of manual origin, or be due to a mechanism known in the art, such as a lanyard 40, attached to one or several arms 11 and coupled to an electromotor 42 as shown in FIGS. 2a and 2b, or alternatively, by mechanical, hydraulic or pneumatic telescopic tubes or masts, or the like). In the deployed state the array can be fixed in the favored form either by means of attached elements of said mechanisms, or by additional struts, or the like, which would block movement of one, or several, arms 11.

This invention has another advantage that in the deployed configuration of FIG. 2a, with almost horizontal PV modules, the wind load on the array is substantially lowered. This strongly relaxes the demand for rigidity of the whole system, and further allows a reduction of the total weight of the array. It is noteworthy that the deployed configuration of FIG. 2b allows a quick change into a wind-neutral deployed configuration of FIG. 2a in response to a suddenly increased wind speed. Also, the presence of gaps between PV modules 5 allows for an efficient air circulation leading to a better natural cooling of the solar modules that helps to improve their efficiency.

Figure 3A:
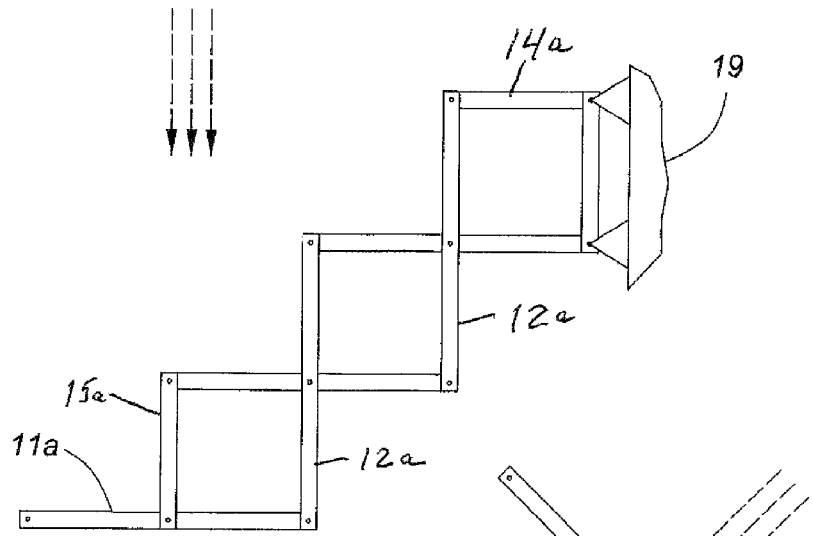
FIGS. 3a and 3b are side elevation views of alternative embodiments of the PV array of the present invention, in their deployed configurations, the PV array of FIG. 3a being mounted on a vertical surface, and the array shown in FIG. 3b being supported on a horizontal surface.

In FIG. 3a deployment of the array occurs in the downward-aside direction either by the gravity force alone, or in combination with a mechanism. Again, the deployment is stopped by fixing one, or several, arms 11 in a needed position, when a favored configuration is achieved.

Figure 3B:
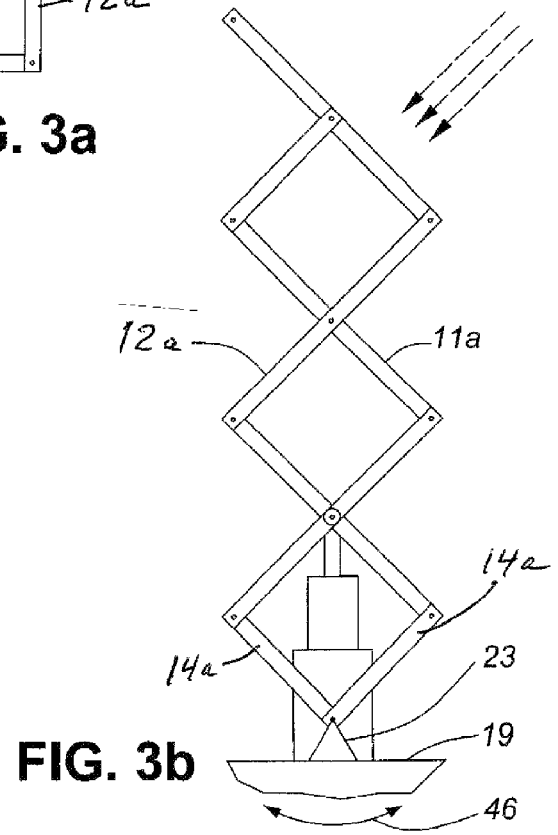

Still another embodiment is shown in FIG. 3b, with only a single vertex of each lowest rhomb of both pantographs 3a,3b in FIG. 2 pivotally fixed to essentially horizontal surface of base 19 by means of mounting elements 23.

Base 19 may be of various origins: it may be a wall or a bottom of the protective container; a wall, a roof, or a ceiling of a building; a pedestal, a rail, a bridge and the like. The base may be a stationary construction, or be similar to a turntable to provide an additional azimuthal rotational degree of freedom as indicated by the arrow 46 in FIG. 3b, allowing the unit to follow the azimuthal movement of the sun. It is important to understand that though only horizontal and vertical bases have explicitly been referred to in the FIGS. described above, the base surface to which mounting elements 23 are connected may have an arbitrary inclination with respect to the horizon.

Figure 4:
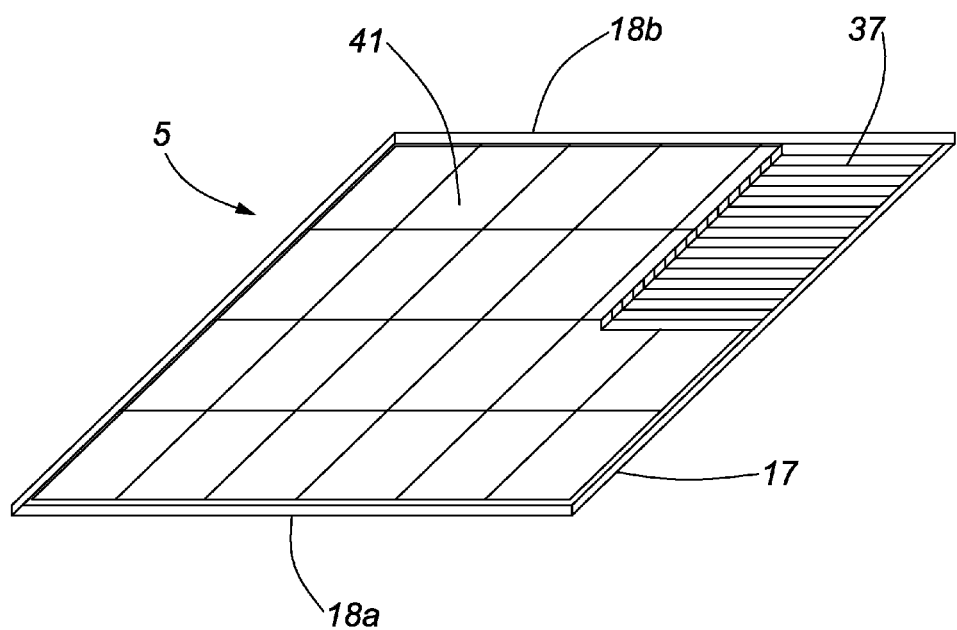
FIG. 4 is a perspective view of a PV model used in the PV generation means of the present invention.

In FIG. 4 solar PV module 5 is shown in more detail. A supporting substrate 37 is attached to frame 17. PV assembly 41, is attached to the upper surface of the substrate, and thereby comprises the PV active surface of each module. The assembly can be made of a plurality of electrically interconnected PV cells. Since no strong demand is placed on the rigidity of the substrate itself, it may be a thin rigid plate, made of metal, glass, high-strength plastic, or the like, or a wire net or mesh, or a tensioned light-weight blanket, which is able to bear the weight of PV assembly 41. In other embodiment simply a tensioned blanket of PV active fabric may be attached to frame 17.

Figure 5:
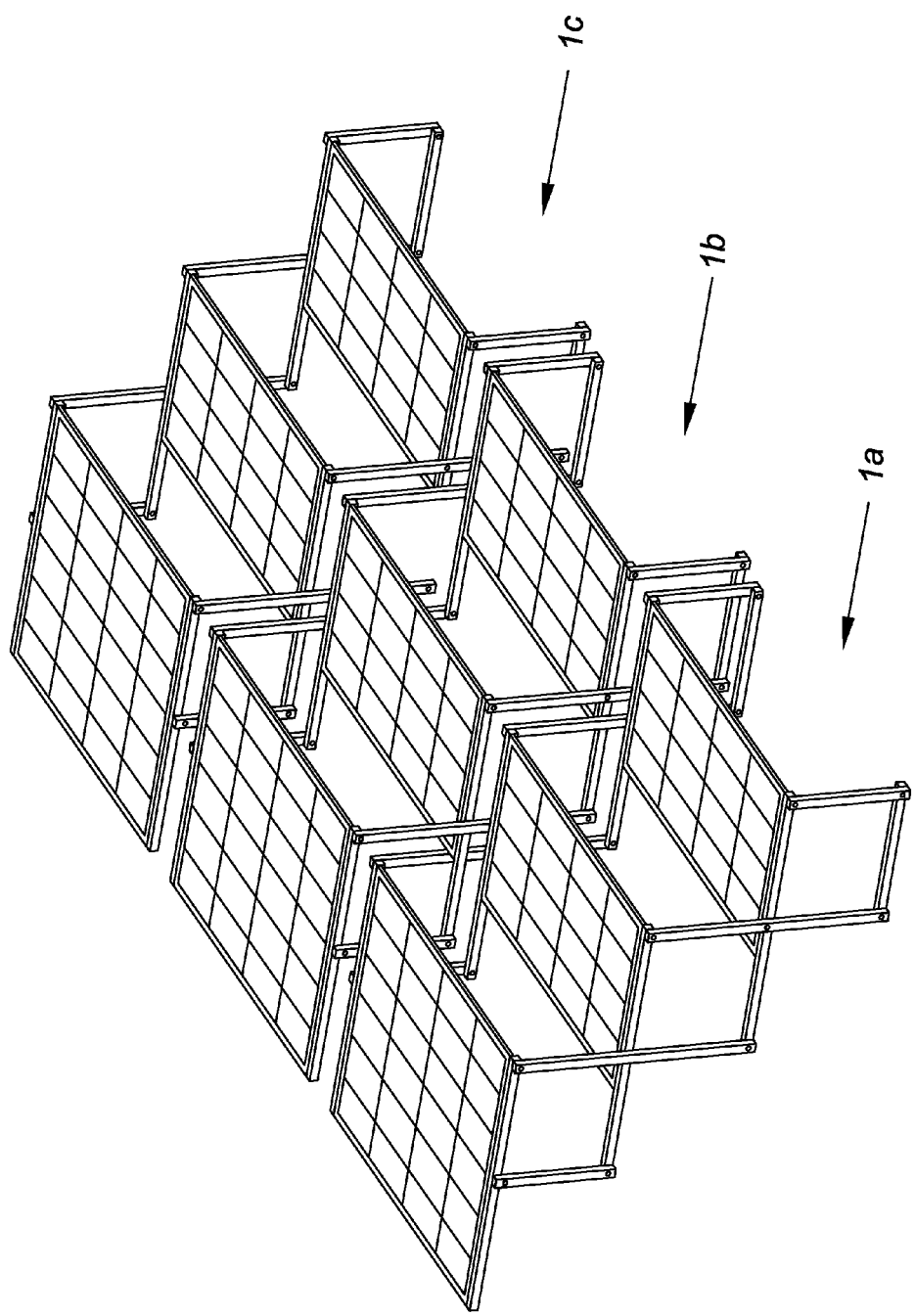
FIG. 5 is a perspective view of a solar PV system made up of the PV array of the present invention.

It is clear that a plurality of PV arrays disclosed in this invention can be combined in a solar system as illustrated in FIG. 5.

While a preferred form of this invention has been described above and shown in the accompanying drawings, it should be understood that applicant does not intend to be limited to the particular details described above and illustrated in the accompanying drawings, but intends to be limited only to the scope of the invention as defined by the following claims. In this regard, the terms as used in the claims are intended to include not only the designs illustrated in the drawings of this application and the equivalent designs discussed in the text, but it is also intended to cover other equivalents now known to those skilled in the art, or those equivalents which may become known to those skilled in the art in the future.

What is claimed is:

1. A lightweight photovoltaic array which may be stowed under bad weather conditions and which array may be deployed under favorable conditions, said array comprising:
   a base having a generally planar extending portion;
   a plurality of photovoltaic modules;
   a support unit for the photovoltaic modules wherein, the support unit includes laterally spaced pantographs comprising
      one or more pairs of opposed elongated arms to which the photovoltaic units are attached, one end of a first pair of opposed elongated arms closest to the base being pivotally secured directly to the generally planar extending portion of the base,
      one or more pairs of opposed connecting arms being pivotally interconnected to the one or more pairs of opposed elongated arms in the form of scissors linkage,
      a first pair of short links, one end of each of the first short links being pivotally connected directly to the generally planar extending portion of the base, and the other end being pivotally connected directly to an end of a first pair of the one or more pairs of opposed a connecting arms, the first pair short links being parallel to the elongated arms, and
      a further pair of short links extending between a second and third pairs of the one or more opposed elongated arms; and
   means for moving the support unit between a stowed position and a deployed position and which may position the photovolaic modules at various optimal inclinations with respect to the position of the sun when in the deployed position.

2. The photovoltaic array as set forth in claim 1 further characterized by the provision of a container in which the support unit and the plurality of photovoltaic modules may be held when desired.

3. The photovoltaic array as set forth in claim 1 wherein the angles of the elongated arms may be adjusted relative to the base to achieve optimal inclination of all of the photovoltaic modules with respect to the current elevation and direction of the sun and to achieve uniform illumination of the photovoltaic modules.

4. The photovoltaic array as set forth in claim 1, in which the means for moving the support unit to position the photovoltaic modules at various optimal inclination with respect to the position of the sun is a lanyard which is attached to one of several arms and is coupled to an electro motor mounted on the base, operation of the electro motor causing the array to be raised and lowered.

* * * * *